United States Patent [19]

Varacins

[11] 4,206,391

[45] Jun. 3, 1980

[54] APPARATUS FOR TRACKING A SEAM

[75] Inventor: Alan J. Varacins, Downers Grove, Ill.

[73] Assignee: Gard, Inc., Niles, Ill.

[21] Appl. No.: 941,069

[22] Filed: Sep. 11, 1978

[51] Int. Cl.² ............................................. G05B 17/36
[52] U.S. Cl. ................................... 318/576; 318/653; 219/124.34
[58] Field of Search .............................. 318/576, 653; 219/124.34

[56] References Cited

U.S. PATENT DOCUMENTS

| | | | |
|---|---|---|---|
| 2,921,179 | 1/1960 | Anderson | 318/576 X |
| 2,971,079 | 2/1961 | Sommeria | 29/124.34 |
| 3,141,952 | 7/1964 | Preston | 318/576 X |
| 3,201,562 | 8/1965 | Anderson | 318/576 X |
| 3,484,667 | 12/1969 | Wofsey | 318/576 |
| 4,015,101 | 3/1977 | Hannappel et al. | 318/576 X |

Primary Examiner—B. Dobeck
Attorney, Agent, or Firm—Vogel, Dithmar, Stotland, Stratman & Levy

[57] ABSTRACT

Apparatus for tracking a seam between two work members comprising a sensor including a housing with an insulating mounting board therein carrying two first ferrite cores and two second ferrite cores on the upper surface thereof, the two first ferrite cores being each curved in planes normal to the board and each having the faces at the ends thereof lying in a common plane with the first ones of the faces thereof in alignment along a longitudinal axis in the board, the two second ferrite cores being each curved in planes normal to the board and each having a first one of the faces at the ends thereof lying in the common plane and spaced laterally of the longitudinal axis equidistantly, two first coils wound around the first cores and connected in series aiding relation to two second coils wound around the second cores, a signal generator connected to the coils and means for comprising the combined permeabilities in the flux paths of each first core and associated second core with the other first core and its associated second core to generate an error signal used to return the work element to a position overlying the seam.

52 Claims, 12 Drawing Figures

APPARATUS FOR TRACKING A SEAM

PRIOR ART STATEMENT AND BACKGROUND OF THE INVENTION

The present invention relates generally to improvements in apparatus for tracking a seam between two work members that are to be joined, such as by welding, and specifically to the provision of such tracking apparatus which is simpler in construction, which can be used on a greater variety of seams, which provides better tracking and which compensates for any tilting of the seam sensor.

Several apparatus for tracking seams have been provided heretofore, and suitable examples thereof are illustrated in the following U.S. Pat. Nos. 2,921,179 granted Jan. 12, 1960 to N. E. Anderson; 2,971,079 granted Feb. 7, 1961 to M. R. Sommeria; 3,017,496 granted Jan. 16, 1962 to W. J. Greene; 3,156,856 granted Nov. 10, 1964 to H. M. Nance, 3,171,071 granted Feb. 23, 1965 to R. L. Brown; 3,179,786 granted Apr. 20, 1965 to W. J. Greene; 3,201,562 granted Apr. 17, 1965 to N. E. Anderson; 3,359,486 granted Dec. 19, 1967 to D. R. Brosious, and 3,484,687 granted Dec. 16, 1969 to D. Wofsey. None of these prior patents shows the use of ferrite cores in a sensing head or the simplicity of construction of the present invention; the ferrite cores provide a better control signal for controlling the tracking apparatus.

Among the patents referred to, only the Wofsey U.S. Pat. No. 3,484,687 discloses apparatus for correcting the control signal to compensate for tilt of the primary sensors about an axis parallel to the seam on which the apparatus is operating. The present invention provides an improved and simplified tilt compensating circuit which is not found in any of the above listed prior art.

SUMMARY OF THE INVENTION

The present invention provides a seam tracking apparatus which more faithfully follows the associated seam between the underlying work members and which better compensates for any tilting of the primary sensors about an axis parallel to the associated seam.

This is accomplished in the present invention, and it is an object of the present invention to accomplish these desired results, by providing an apparatus for tracking a seam between two ferromagnetic members and controlling a work element to move along a path overlying the seam comprising two ferrite cores each curved in first planes and each having the faces at the ends thereof lying essentially in a second common plane that is essentially normal to the first planes, the cores being mounted with first ones of the faces thereof in general alignment along a longitudinal axis in the second plane and adapted in use to overlie the seam between the associated ferromagnetic members with the second ones of the faces thereof equidistantly spaced from the longitudinal axis and the surface of the associated ferromagnetic members, two coils would respectively around the cores and connected to each other in series relationship, a signal generator connected to the coils and creating a magnetic flux through the cores and the respective faces thereof and between the respective faces of the cores and through the seam in the associated ferromagnetic member, means for comparing the permeability in the flux paths of the two cores and generating an error signal indicating a lateral position error of the cores with respect to the seam between the ferromagnetic members and a phase difference with respect to a reference signal indicating the direction of the lateral position error, and means responsive to the error signal and the phase difference for returning the first ones of the faces of the cores and the work element to positions overlying the seam and until the position error signal and the phase difference are corrected.

Another object of the invention is to provide a seam tracking apparatus of the type set forth above wherein two second ferrite cores are provided each curved in third planes and each having the first one of the faces of the ends thereof lying essentially in the second common plane and spaced laterally of the longitudinal axis essentially equidistantly with the second one of the faces thereof spaced laterally of the longitudinal axis essentially equidistantly, two second coils respectively wound around the second cores with each of the first coils being connected in series aiding relationship with the one of the second coils disposed on the other side of the longitudinal axis, the second cores and the second coils compensating for any error signal generated by the tilting of the second common plane with respect to the adjacent surfaces of the associated ferromagnetic members about the longitudinal axis.

Yet another object of the invention is to provide a seam tracking apparatus for use with non-ferromagnetic members wherein the first ones of the faces of the cores are equidistantly spaced from a longitudinal axis in the second plane that is adapted in use to overlie the seam between the associated non-ferromagnetic members, and means is provided responsive to the error signal and the phase difference for returning the cores to positions such that the longitudinal axis therebetween and the work element overlie the seam.

Still another object of the invention is to provide a seam tracking apparatus of the type set forth for use with non-ferromagnetic members and having two second ferrite cores spaced laterally of the longitudinal axis essentially equidistantly, the second cores and the associated second coils compensating for any error signal generated by the tilting of the second common plane with respect to the adjacent surfaces of the associated non-ferromagnetic members about the longitudinal axis.

A further object of the invention is to provide a sensor in seam tracking apparatus comprising an annular housing open at the bottom and having a free edge therearound disposed in the first plane and adapted to ride upon the adjacent surfaces of the work members defining an associated seam, an insulating mounting board mounted in the housing and having a first surface disposed toward the first plane and spaced inwardly therefrom and having a second surface disposed away from the first plane and defining a second plane essentially parallel to the first plane, two ferrite cores mounted on the mounting board and each curved in third planes and each having the faces at the ends thereof lying essentially in the second plane with the third planes essentially normal to the second plane, the cores being mounted with first ones of the faces thereof in general alignment along a longitudinal axis of the second plane and with the second ones of the faces thereof equidistantly spaced from the longitudinal axis, and two coils wound respectively around the cores and connected to each other in series relationship and having the conductors thereto extending outwardly through the housing.

A still further object of the invention is to provide a sensor as set forth in the preceding object and further including two second ferrite cores each curved in fourth planes and each having a first one of the faces at the ends thereof lying essentially in the second plane and spaced laterally of the longitudinal axis essentially equidistantly with the second one of the faces thereof spaced laterally of the longitudinal axis essentially equidistantly, and two second coils respectively wound around said second cores with each of the first coils being connected in series aiding relationship with one of the second coils.

Further features of the invention pertain to the particular arrangement of the parts of the seam tracking apparatus, whereby the above outlined and additional operating features thereof are attained.

The invention, both as to its organization and method of operation, together with further features and advantages thereof will best be understood with reference to the following specifications taken in connection with the accompanying drawings.

DESCRIPTION OF THE PREFERRED EMBODIMENTS

Figure 1:
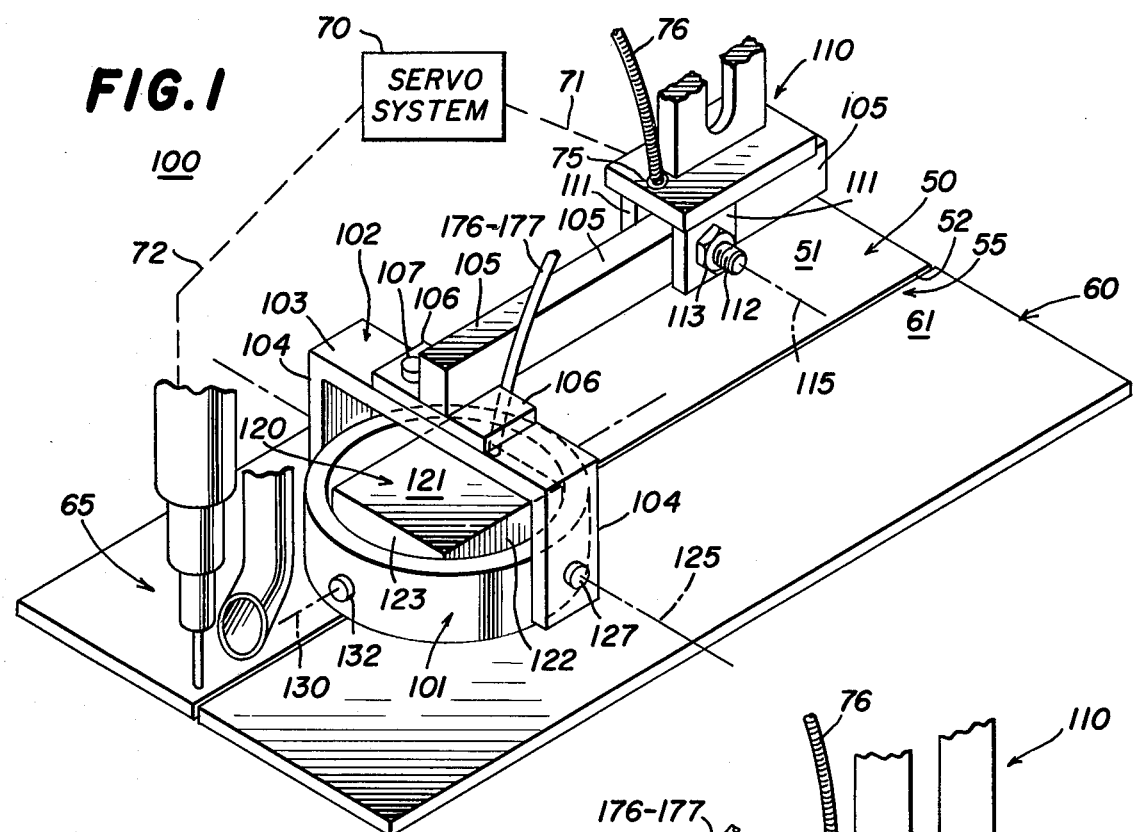
FIG. 1 is a perspective view of one preferred form of a seam tracking apparatus made in accordance with and embodying the principles of the present invention, certain portions of the apparatus being broken away for illustrative purposes.

There is illustrated in FIGS. 1 to 6 of the drawings a first preferred embodiment of a seam tracking apparatus 100 made in accordance with and embodying the principles of the present invention. As illustrated, the apparatus 100 is used to track a seam 55 between two plates 50 and 60 that are formed of ferromagnetic material. The plates 50 and 60 have top surfaces 51 and 61, respectively, and facing edges 52 and 62, respectively, that define the seam 55 therebetween. The seam 55 illustrated is a so-called square butt seam which is particularly useful when the plates 50 and 60 are to be joined by welding using the welding head 65 diagrammatically illustrated in FIG. 1. With the system illustrated, the plates 50 and 60 can be semi-automatically butt welded without having to bevel or otherwise prepare the edges that form the seam to be welded. The disclosed system will also track the single edge in a lap weld.

Mechanism not shown drives the seam tracking apparatus 100 and the associated welding head 65 generally longitudinally of the seam 55, the seam tracking apparatus serving to center the welding head 65 over the seam 55 regardless of deviations in the direction of the seam 55, deviations in width of the seam 55 and changes in the elevation of the top surfaces 51 and 61 of the plates being welded. The seam tracking apparatus 100 works through a servo system 70 diagrammatically illustrated in FIG. 1 and connected by suitable mechanical linkage 71 to the seam tracking apparatus 100 and through suitable mechanical linkage 72 to the welding head 65.

Figure 2:
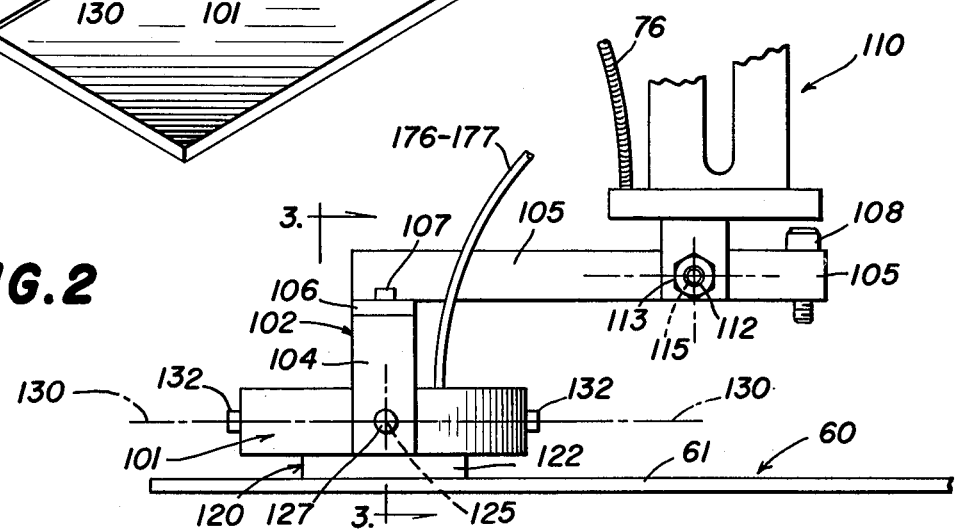
FIG. 2 is a side elevational view of the seam tracking apparatus in FIG. 1.
Figure 3:
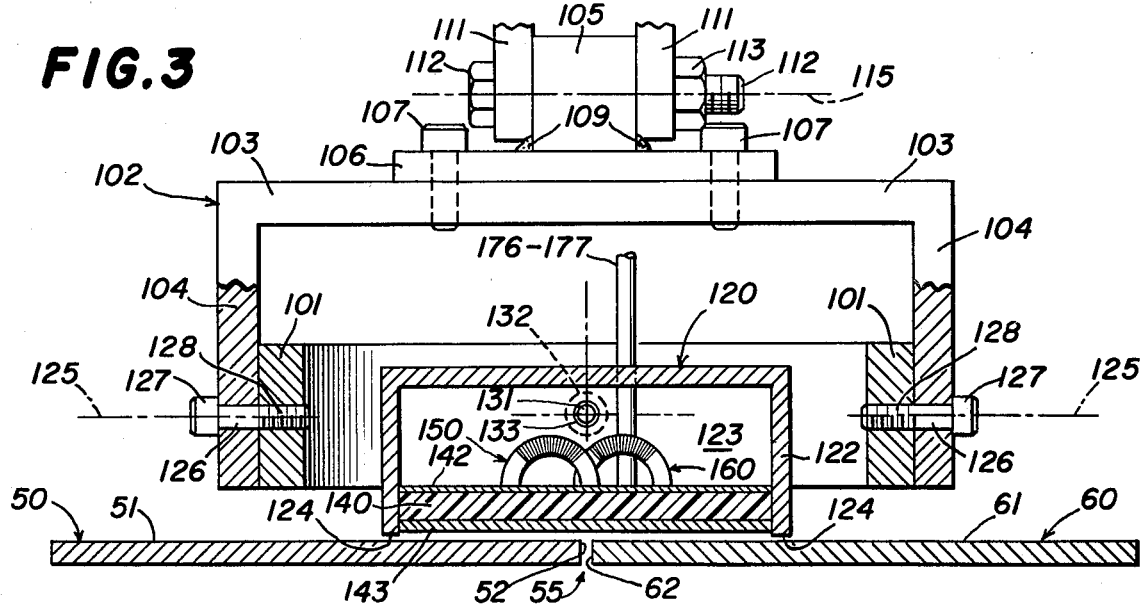
FIG. 3 is a view in vertical section on an enlarged scale along the line 3—3 in FIG. 2.
Figure 4:
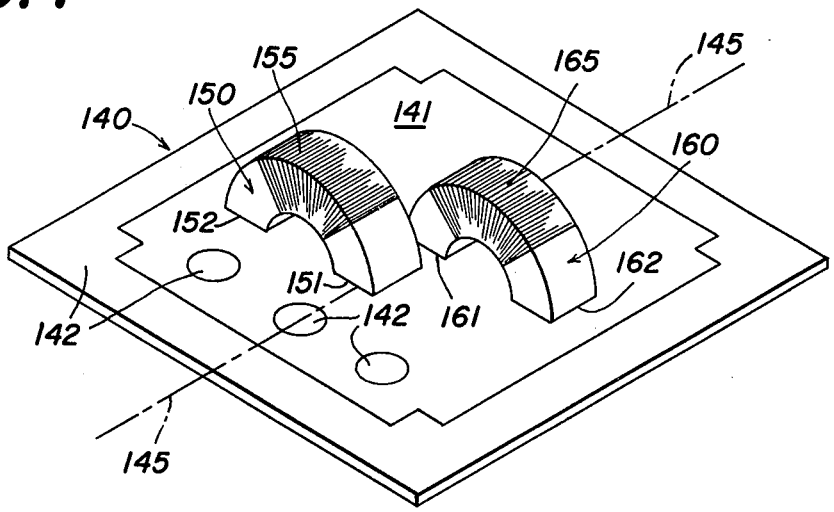
FIG. 4 is a further enlarged view in perspective of a portion of the sensing head showing the disposition of the ferrite cores thereon.

The seam tracking apparatus 100 includes an annular ring 102 that is pivotally mounted on a U-shaped bracket 102 having a bight portion 103 and two depending legs 104. The bracket 102 is connected to a pivot arm 105, and more specifically a plate 106 is welded to the left-hand end of the pivot arm 105 as at 109 (see FIG. 3) and two bolts 107 secure the plate 106 to the bight portion 103 of the bracket 102. The right-hand end of the pivot arm 105 as viewed in FIGS. 1 and 2 is pivotally mounted upon a vertically adjustable mount 110 having two depending arms 111 disposed on opposite sides of the pivot arm 105 and having aligned apertures receiving a bolt 112 therethrough secured by a nut 113. The longitudinal axis of the bolt 112 provides a pivot axis 115 about which the arm 105 pivots with respect to the mount 110. A stop 108 mounted at the extreme right-hand end of the pivot arm 105 limits the counterclockwise pivoting of the pivot arm 105 with respect to the mount 110 as viewed in FIG. 2. By moving the mount 110 upwardly and downwardly and laterally, the servo system 70 can control the position of the seam tracking apparatus 100 with respect to the seam 55.

Mounted in the ring 101 is a sensor housing 120, formed of aluminum, and including a substantially rectangular top wall 121 having two depending opposed side walls 122 and two opposed depending end walls 123, the walls having the vertical edges thereof joined, and having a common lower edge 124 adapted to spaced a short distance above the upper surfaces 51 and 61 of the plates 50 and 60 being welded. A gimbal arrangement mounts the housing 120 and includes a transverse pivot axis 125 provided by side mounting bolts 126 having heads 127 and threaded ends 128 engaged in threaded openings in the ring 101. A longitudinal pivot axis 130 is established by two end mounting bolts 131 having heads 132 with threaded ends 133 extending into threaded openings in the end walls 123 of the sensor housing 120. By this mounting arrangement, the ring 101 and the sensor housing 120 can pivot together about the transverse pivot axis 125 with respect to the U-shaped bracket 102, and the sensor housing 120 can pivot about the longitudinal pivot axis 130 with respect to the ring 101.

Disposed within and fixedly secured to the sensor housing 120 is a mounting board 140 formed of plastic or other insulating material. Portions of the upper surface 141 of the mounting board 140 carry a copper plating 142 for convenience in electrical connections. The under surface of the mounting board is provided with a wear-resistant coating 143 formed, for example, of aluminum oxide. Mounted on the upper surface of the mounting board 140 are two ferrite cores 150 and 160 which are semi-circular in shape, being one-half of a toroid. The core 150 has a first essentially rectangular face 151 overlying a longitudinal axis 145 of the mounting board 140, the longitudinal axis 145 in use overlying the adjacent seam 55 (see FIG. 5 also). The core 150 has a second face 152 that is spaced from the longitudinal axis 145, the longitudinal center line of the core 150 lying in a plane disposed normal to the mounting board 140 and the longitudinal axis 145. Wound about the first core 150 is a coil 155 which, when energized, creates a magnetic flux field disposed along a flux path generally designated by the numeral 156 and extending through the core 150, the face 151, the mounting board 140, the seam 55, the associated plate 50, a gap 157 between the plate 50 and the mounting board 140, again through the mounting board 140, and the face 152.

The second ferrite core 160 is identical to the first ferrite core 150 and is provided with a first face 161 overlying the longitudinal axis 145 and in use the seam 55, with a second face 162 disposed away from the longitudinal axis 145 with the plane in which the core 160 was curved being normal to both the mounting board 140 and the longitudinal axis 145. A coil 165 is provided about the center of the core 160 and when energized generates a magnetic flux along a flux path illustrated at 166 that extends through the core 160, the first face 161, the mounting board 140, the gap provided by the seam 55, the associated plate 60, a gap 167 between the mounting board 140 and the plate 60, and the second face 162. The ferrite cores 150 and 160 are disposed symmetrically about the longitudinal axis 145.

Figure 6:
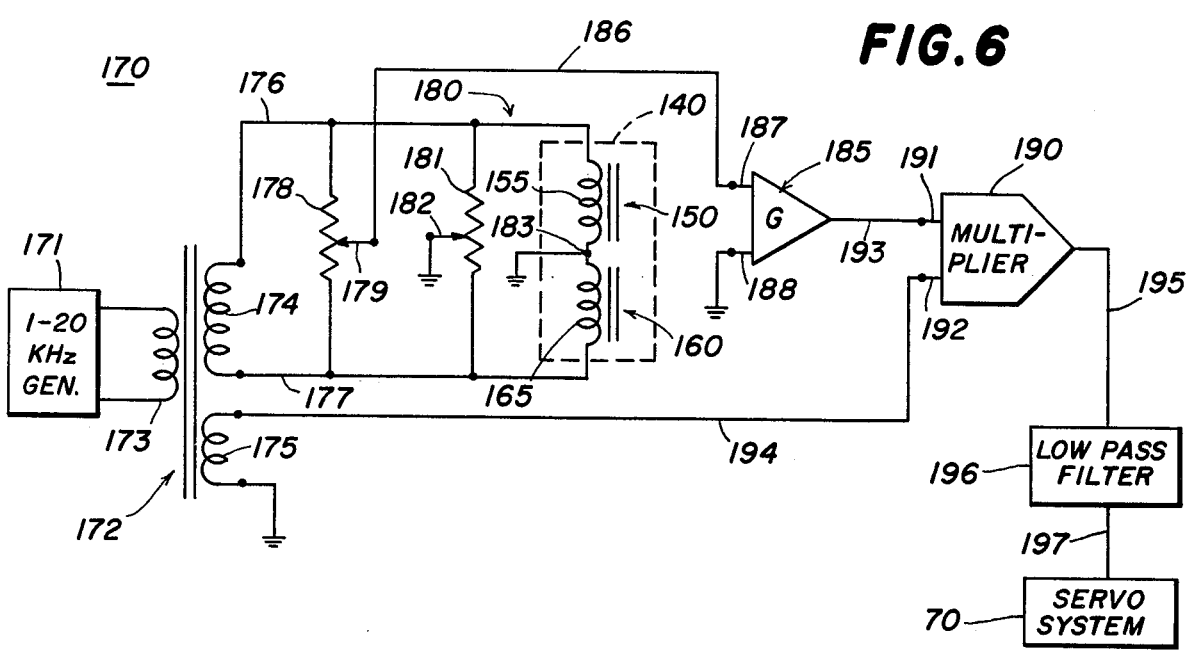
FIG. 6 is a schematic diagram of the electrical circuit forming a part of the seam tracking apparatus of FIGS. 1 to 5.

The coils 155 and 165 are incorporated into a control circuit 170 illustrated in FIG. 6 of the drawings. A signal generator 171 is provided that generates a signal in the range from about 1 KHz to about 20 KHz, the output from the generator 171 being applied to a transformer 172, and particularly the primary coil 173 thereof. A first secondary coil 174 is provided having conductors 176 and 177 connected respectively to the output terminals thereof. Connected between the conductors 176 and 177 is a trimmer potentiometer 178 having a movable contact arm 179 which is connected to provide the output from a bridge circuit 180. Two of the legs in the bridge 180 are provided by a balancing potentiometer 181 connected between the conductors 176 and 177 and having a movable contact arm 182 that is grounded. The other two legs of the bridge 180 are provided by the coils 155 and 165 that are connected in series between the conductors 176 and 177, the juncture 183 between the coils 155 and 165 being grounded.

A portion of the output signal from the bridge 180 is picked off by the contact arm 179 from the trimmer potentiometer 178 and is supplied to an amplifier 185 which is a simple linear amplifier. More specifically, one of the inputs 187 to the amplifier 185 is connected to the conductor 186, and the other input 188 to the amplifier 185 is grounded. The output from the amplifier 185 is connected to one of the inputs to a multiplier 190 that is an integrated circuit used as a phase detector. One of the inputs 191 to the multiplier 190 is connected by a conductor 193 to the output of the amplifier 185, while the second input 192 to the multiplier 190 is connected by a conductor 194 to one of the output terminals of the second secondary coil 175, the other terminal of the coil 175 being grounded. When a sine wave is applied to the input 191 and a reference sine wave is applied to the input 190, the output from the multiplier 190 is a bipolar D.C. voltage proportional to the product of the phase and the amplitudes of the sine waves applied to the inputs 191 and 192. The output from the multiplier 190 is applied to a conductor 195 connected as an input to a low-pass filter 196 which removes a second harmonic component from the output of the multiplier 190. The output from the filter 196 is applied by a conductor 197 to the servo system 70 that controls the position of the seam tracking apparatus 100 and the welding head 65, the signal appearing on the conductor 197 being a D.C. voltage, the polarity of which is determined by the phase between the inputs 191 and 192 to the multiplier 190 and the amplitude of which is proportional to the amplitude of the error signal appearing on the conductor 193, all as will be explained more fully hereinafter.

Figure 5:
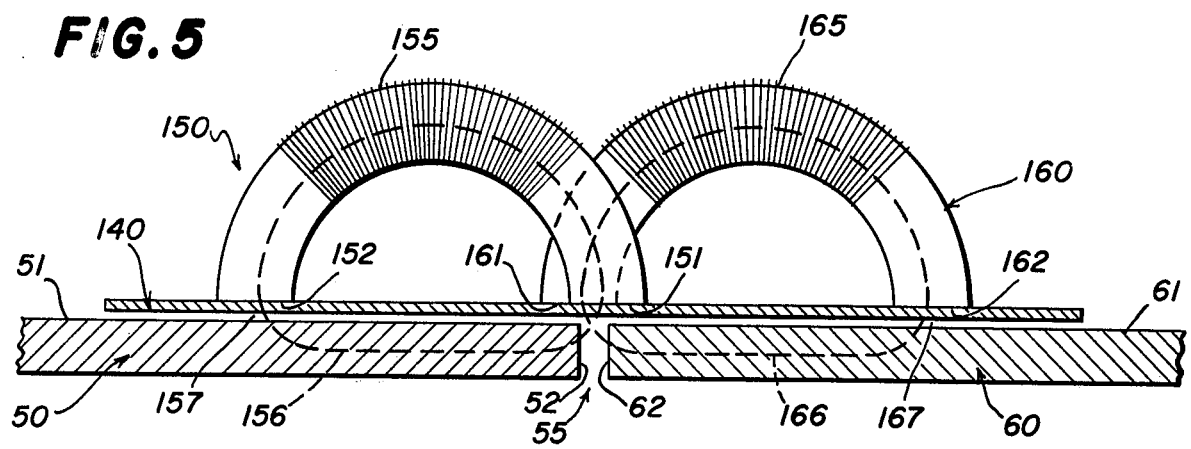
FIG. 5 is a yet further enlarged view in vertical section normal to the seam between two work members and showing the relationship of the two ferrite cores thereto when the work members are ferromagnetic material.

In the operation of the seam tracking apparatus 100, the sensor housing 120 and the associated welding head 65 are positioned in general alignment over an associated seam 55 between the two plates 50 and 60 that are to be welded. The desired height of the welding head 65 above the top surfaces 51 and 61 is adjusted and the servo system 70 set. The desired height is maintained by a proximity sensor 75 having electrical connections 76, the proximity sensor 75 detecting the angle between the mount 110 and the pivot arm 105. The proximity sensor 75 is of the conventional eddy current type, the signal therefrom being linear whereby a proportional vertical adjustment system can be used and applied to the servo system 70. The control circuit 170 is energized and the generator 171 placed in operation to produce a suitable output signal, a signal of about 10 KHz being recommended for ferromagnetic work pieces 50 and 60, such as steel work pieces 50 and 60. The ferrite cores 150 and 160 are arranged with the faces 151 and 161 thereof in longitudinal alignment and over the associated seam 55 as illustrated in FIG. 5. The contact arm 179 of the trimmer potentiometer 178 is adjusted to compensate for resistance differences in the legs of the bridge 180, while the contact arm 182 is adjusted on the balancing potentiometer 181 to compensate for imbalance in the reactive impedance, these contact arms being adjusted until there is a zero output from the amplifier 185 when the ferrite cores, and particularly the faces 151 and 161 thereof, are centered over the seam 55 as illustrated in FIG. 5.

Any movement of the faces 151 and 161 from alignment over the longitudinal axis 145 and the associated seam 55 will produce an imbalance in the bridge 180. More specifically, if the cores 150 and 160 shift to the left as viewed in FIG. 5 with respect to the seam 55, then the permeability in the flux path 156 will be increased since there will be a lesser portion of the flux path 156 through the gap in the seam 55 which has low permeability, and there will be a greater portion of the flux path 156 in the ferromagnetic plate 50 of high permeability, whereby the total permeability in the flux path 156 will be substantially increased. On the other hand, the permeability in the flux path 166 will be decreased since a greater portion of the seam 55 will be in the flux path 166, thus decreasing the permeability, and a lesser portion of the flux path 166 will be in the ferromagnetic work piece 60, again reducing the permeability in the flux path 166. The changes in permeability in the two flux paths 156 and 166 will be conveyed by the coils 155 and 165 to the bridge 180 to cause an imbalance of the bridge and a consequent error signal in the form of a sine wave on the resistor 178, a portion of which will be conveyed by the contact arm 179 and the conductor 186 as an input to the linear amplifier 185. Depending upon the direction of shift of the cores 150 and 160 with respect to the gap 155, the phase of the error signal from the amplifier 185 fed to the input 191 will either be in phase or 180° out of phase with the reference signal on the conductor 194 applied to the input 192. The output from the multiplier 190 will be a D.C. signal, the amplitude of which will be proportional to the amplitude of the error signal from the bridge 180, and the polarity of which will be dependent upon the direction of the lateral movement of the core faces 151 and 161 with respect to the seam 55. The D.C. error signal appearing on the conductor 195 also has associated therewith a second harmonic component which is filtered out by the filter 196 so that only the D.C. error signal of a given polarity is applied by the conductor 197 to the servo system 70. The servo system 70 acts in response to the error signal to move the seam tracking apparatus 100 and the associated welding head 65 back toward the desired position over the seam 55, such movement reducing the error signal to zero again.

The seam tracking apparatus 100 is substantially simpler than prior art systems used heretofore. Because of the frequency of the generator 171, the system is essentially immune to outside electrical interference. When used in conjunction with ferromagnetic materials, such as iron and steel, the permeability effects in the flux paths 156 and 166 dominate the eddy current effects which are present also in the associated plates 50 and 60. It has been found that by utilizing the permeability effects in the seam tracking apparatus 100, a more responsive and more accurate seam tracking is accomplished by the apparatus 100 as compared to prior devices.

Figure 7:
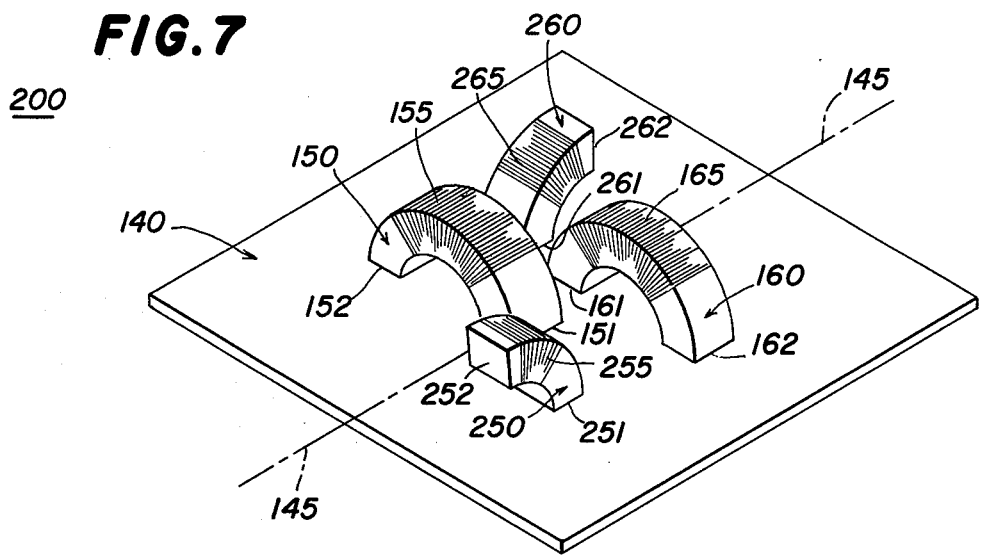
FIG. 7 is a view similar to FIG. 4 and illustrating a second preferred embodiment of the invention incorporating two second core members therein.
Figure 8:
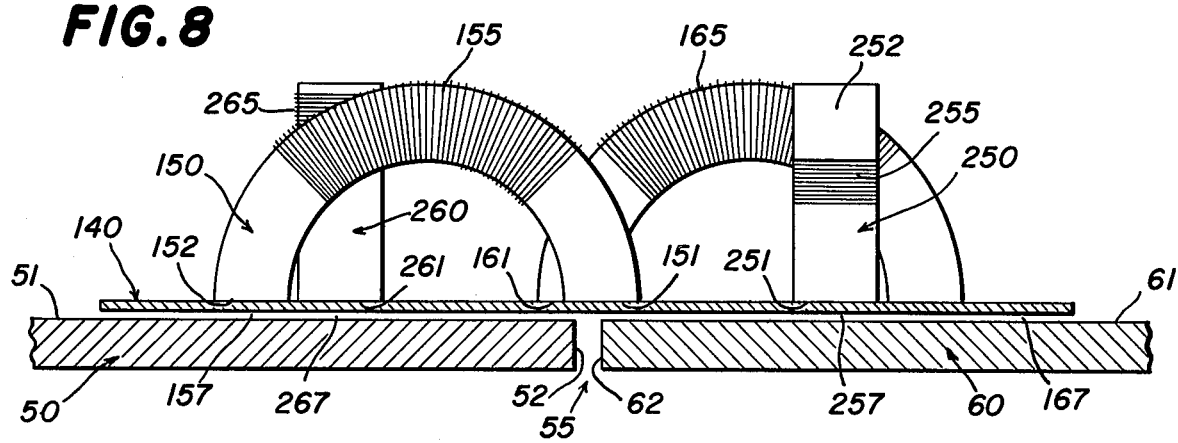
FIG. 8 is a view similar to FIG. 5 and showing the relationship of the cores of FIG. 7 to the seam between associated work members when the work members are ferromagnetic material.

The seam tracking apparatus 100 of FIGS. 1 to 6 operates well for its intended purpose if the faces 152 and 162 of the cores 150 and 160 can be maintained equidistantly spaced from the top surfaces 51 and 61 of the associated plates 50 and 60. In practice it is difficult to maintain these spacings equal, and any inequality in the spacings causes a large signal derived from the uneven spacing to appear as an output from the bridge 180 that masks the signal generated by a deviation of the faces 151 and 161 from their positions over the seam 55. The same effect is caused by any mismatch in the heights of the two plates 50 and 60 forming the seam 55, a condition often found in practice in welding situations. In order to correct for these conditions, a second seam tracking apparatus 200 has been provided and illustrated in FIGS. 7 to 9 utilizing a third ferrite core 250 and a fourth ferrite core 260 to compensate for any tilt of the cores about the longitudinal axis 145 or any deviation in the elevation of the top surfaces 51 and 61 of the two plates 50 and 60 forming the seam 55. As illustrated, the third ferrite core 250 is one-fourth of a circular toroid and has a first face 251 disposed in the same plane as the face 151 and having a second face 252 essentially normal to the plane of the faces 151 and 251. Disposed around the core 250 is a coil 255 which is useful in establishing a flux path that extends through the core 250, the mounting board 140, a gap 257 between the mounting board 140 and the underlying plate 60 and the gap between the face 252 and the underlying plate 60. It will be noted that the first face 251 is spaced from the longitudinal axis 145 and that the plane in which the core 250 is curved is parallel to the longitudinal axis 145 and normal to the plane containing the face 251.

The fourth ferrite core 260 is constructed identical to the third ferrite core 250 and has a first face 261 disposed in the same plane as the face 161 but spaced therefrom and from the longitudinal axis 145. The second face 262 is disposed in a plane substantially normal to the longitudinal axis 145 and the plane containing the first face 261. A coil 265 is provided about the core 260 and develops a magnetic flux in a flux path that extends through the core 260, the mounting board 140, a gap 267 between the mounting board 140 and the underlying plate 50, the plate 50, and the air gap between the face 262 and the underlying plate 50. The face 261 is spaced laterally from the longitudinal axis 145 and the plane in which the core 260 is curved is parallel to the longitudinal axis 165 and normal to the plane containing the face 261. The cores 250 and 260 are arranged symmetrically with respect to each other about the longitudinal axis 145 and with respect to the other cores 150 and 160.

There is illustrated in FIG. 9 a control circuit 270 which incorporates therein the additional cores 250 and 260, but which is otherwise identical to the control circuit 170 described above, and accordingly parts in FIG. 9 that correspond to like parts in FIG. 6 have had numerals from the 200 series applied thereto corresponding to the numerals in the 100 series used in FIG. 6. It will be noted that the coil 255 of the core 250 is connected in series aiding relationship between the conductor 276 and the associated coil 155 of the core 150, while the coil 265 of the core 260 is connected in series aiding relationship between the conductor 277 and the adjacent ends of the coil 165 about the core 160.

Figure 9:
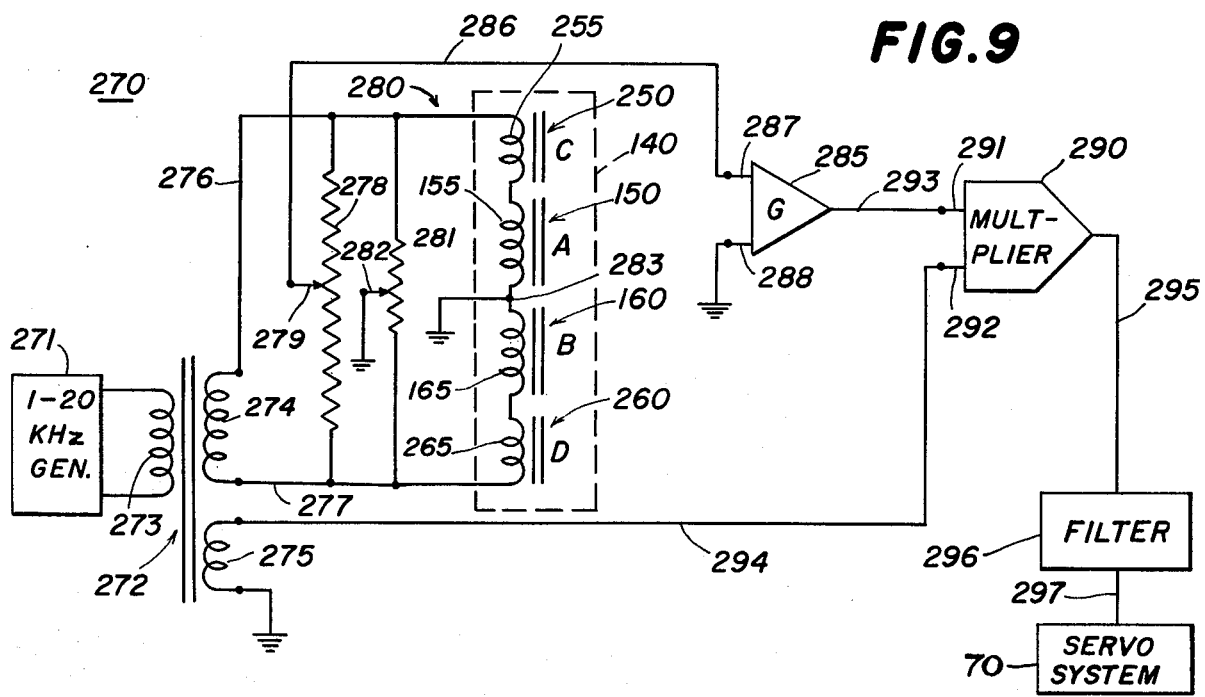
FIG. 9 is a schematic diagram of the electrical circuit for the embodiment illustrated in FIGS. 7 and 8.

Fundamentally, the control circuit 270 of FIG. 9 operates in the same manner as does the control circuit 170 of FIG. 6, except for the action of the coils 255 and 265. If there is any tilt of the mounting board 140 about the longitudinal axis 145, or if there is any deviation in the height of the top surfaces 51 and 61 with respect to each other, then compensating error signals are generated by and detected in the coils 255 and 265. For example, and referring to FIG. 8, if there is a rotation of mounting board 140 about the longitudinal axis 145 in a clockwise direction, the gap 257 will be diminished while the gap 157 will be increased. By providing the proper ratio between the number of turns in the coils 155 and 255, the change in permeabilities produced will be equal and offsetting. Likewise, the clockwise tilting of the mounting board 140 will increase the gap 267 and decrease the gap 167 thus changing the permeabilities by equal and offsetting amounts in the series aiding coils 165 and 265. As a result of the compensation provided by the coils 255 and 265, there will be no error signal from the bridge 280 that is the result of the tilting of the mounting board 140 about its longitudinal axis 145. Likewise, there would be compensating and offsetting signals produced if the level of the top surfaces 51 and 61 varies, thus again assuring that an accurate lateral position error signal is produced by the bridge 280.

Figure 10:
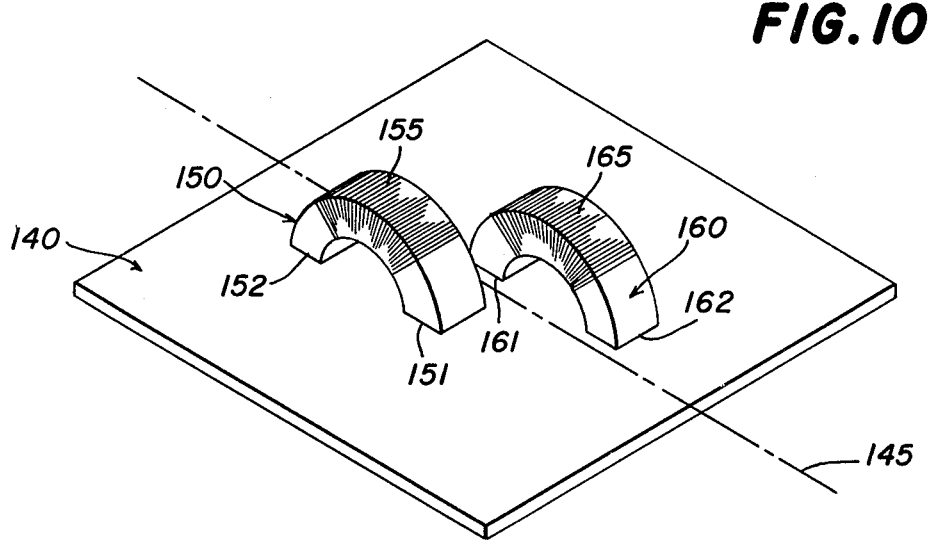
FIG. 10 is a view similar to FIG. 4 but illustrating the orientation of the seam when the associated work members are formed of non-ferromagnetic material.

The arrangements described above in the seam tracking apparatus 100 and the seam tracking apparatus 200 are highly effective and efficient when the plates 50 and 60 are formed of ferromagnetic materials. In such arrangements, the permeability effects dominate over the eddy current effects, whereby the orientation of the faces 151 and 161 to the seam 55 is most advantageous as illustrated. When the plates 50 and 60 are formed of non-ferromagnetic material, such as aluminum, the eddy current effects tend to dominate the permeability effects, whereby a different orientation of the faces 151 and 161 to the seam 55 is desirable. There is illustrated in FIG. 10 the desired orientation of the cores 150 and 160 to a longitudinal axis 145 that is to overlie the seam 55 between two non-ferromagnetic plates 50 and 60. More specifically, the longitudinal axis 145 has been turned 90° and is disposed equidistantly between the adjacent surfaces of the cores 150 and 160. It has been found that in this arrangement, a more responsive seam tracking apparatus is provided when dealing with non-ferromagnetic plates 50 and 60. It will be noted that the cores 150 and 160 are still symmetrical about the longitudinal axis 145 and the faces 151 and 161 are in essential lateral alignment and equidistantly spaced from the longitudinal axis 145. The control circuit 170 is utilized but the preferred frequency of operation of the generator 170 is about 20 KHz.

Figure 11:
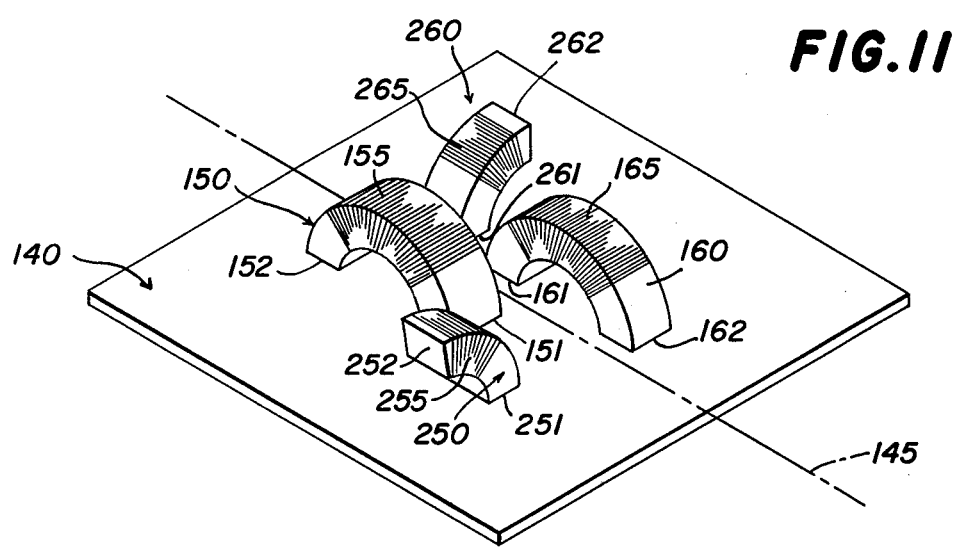
FIG. 11 is a view similar to FIG. 8 and illustrating the orientation of the parts when the work members are formed of non-ferromagnetic material.
Figure 12:
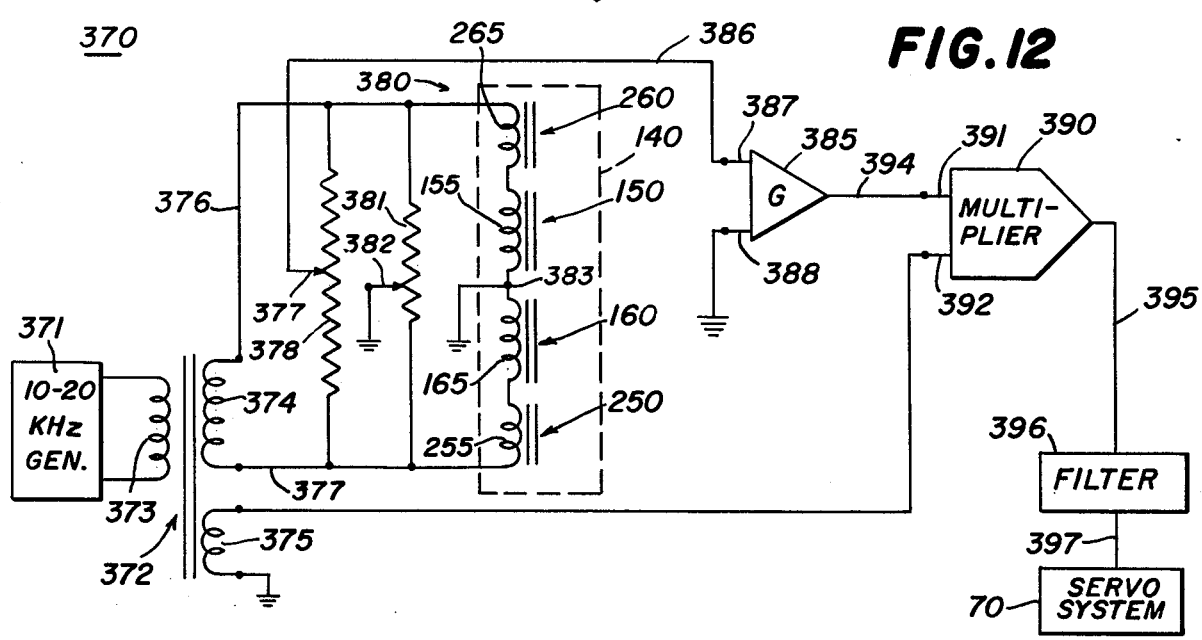
FIG. 12 is a schematic diagram of the electrical circuit used with the embodiment of FIG. 11.

When it is desired to compensate for a tilting of the mounting board about the longitudinal axis 145 in FIGS. 10 and 11 or to compensate for differences in elevation of the top surfaces 51 and 61 of associated plates 50 and 60 formed of non-ferromagnetic materials, the second set of ferrite cores 250 and 260 is again provided. In FIG. 12, there is illustrated the control circuit 370 for the arrangement of FIG. 11, the connection and arrangement of all the parts of the circuit 370 being identical to those for the circuit 270 but for two exceptions and accordingly, parts in FIG. 12 that correspond to like parts in FIG. 9 have had numerals from the 300 series applied thereto corresponding to the numerals in the 200 series used in FIG. 9. The exceptions noted are that the coil 265 of the ferrite core 260 is connected in series aiding relationship between the conductor 376 and the adjacent terminal of the coil 155 of the core 150, and similarly, the coil 255 of the core 250 is connected in series aiding relationship between the conductor 377 and the adjacent terminal of the coil 165 of the core 160. With the cores connected in this fashion, any tilt of the mounting board 140 about the longitudinal axis 145 results in a compensating signal being generated by the coil 265 to compensate for the tilting error signal in the coil 155 and a compensating signal as generated in the coil 255 to cancel the tilting error signal in the coil 165, all as has been explained more fully hereinabove. As a result, the control circuit 370 will not be adversely affected in its lateral positioning of the associated welding head over the associated seam by tilting of the mounting board 140 about the axis 145 or by changes in the elevations of the top surfaces 51 and 61 of the two plates 50 and 60 being welded.

In a constructional example of a seam tracking apparatus made in accordance with the present invention, the ferrite cores are all fabricated from toroids of ferrite material sold by Indiana General under the trademark "Ferramic" and identified as part No. F624-19-Q1. The toroid has an outer diameter of 1 inch, an inner diameter of 0.54 inch and a thickness of 0.25 inch. The ferrite material has an inductance factor [$A_L$(NOM)] of 80, the inductance factor being defined as the self-inductance (L) in nanohenries (nh) divided by turns (N) squared, with a tolerance of ± 25%, has a permeability [$u_i$ (REF)] of 125, and is formed of a ceramic material designated Q1. The core constants are as follows: $C_1$ is 20.73 cm$^{-1}$; an effective magnetic path length, $l_e$, of 5.42 cm; an effective cross sectional area of an equivalent toroid, $A_e$, of 0.261 cm$^2$; and an effective volume, $V_e$, of 1.45 cm$^3$. The coils 155 and 165 about the cores 150 and 160, respectively, are each formed preferably of 32 gauge wire, a suitable wire being Belden No. 8056, and each comprising 50 turns. The coils 255 and 265 about the cores 250 and 260, respectively, are also preferably formed of 32 gauge wire, Belden No. 8056, and each contains 55 turns. The signal generators 171, 271 and 371 operate at frequencies determined essentially by the material forming the plates 50 and 60 between which the seam 55 is disposed. For ferromagnetic materials, frequencies in the lower end of the range of about 1 KHz to about 20 KHz, for example, a frequency in the range from about 1 KHz to about 10 KHz is preferred, and when dealing with non-ferromagnetic materials, such as aluminum, frequencies in the upper end of the range are preferred, i.e., a frequency in the range from about 10 KHz to about 20 KHz. The amplifier 185, 285 and 385 preferably has an FET input and an example of a suitable amplifier is that provided by National Semi-Conductor and sold under the trade designation LF357. The multiplier 190, 290 and 390 may preferably be sold by Analogic under the trade designation AD534.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. Apparatus for tracking a seam between two ferromagnetic members and controlling a work element to move along a path overlying the seam, the apparatus comprising two ferrite cores each curved in first planes and each having the faces at the ends thereof lying essentially in a second common plane that is essentially normal to said first planes, said cores being mounted with first ones of the faces thereof in general alignment along a longitudinal axis in said second plane and adapted in use to overlie the seam between the associated ferromagnetic members with the second ones of the faces thereof equidistantly spaced from said longitudinal axis and the associated ferromagnetic members, two coils wound respectively around said cores and connected to each other in series relationship, a signal generator connected to said coils and creating a magnetic flux through said cores and the respective faces thereof and between the respective faces of said cores and through the seam and the associated ferromagnetic member, means for comparing the permeability in the flux paths of the two cores and generating an error signal indicating a lateral position error of the cores with respect to the seam between the ferromagnetic members and a phase difference with respect to a reference signal indicating the direction of the lateral position error, and means responsive to the error signal and the phase difference for returning said first ones of the faces of the cores and the work element to positions overlying the seam and until the position error signal and the phase difference are corrected.

2. The apparatus for tracking a seam set forth in claim 1, wherein said first planes are essentially parallel to each other.

3. The apparatus for tracking a seam set forth in claim 1, wherein said ferrite cores are semi-circular in shape in the associated first planes.

4. The apparatus for tracking a seam set forth in claim 1, wherein said first planes are substantially normal to said longitudinal axis.

5. The apparatus for tracking a seam set forth in claim 1, wherein said first ones of the faces are adjacent to each other.

6. The apparatus for tracking a seam set forth in claim 1, wherein said coils are essentially identical.

7. The apparatus for tracking a seam set forth in claim 1, wherein said signal generator produces a signal in the range from about 1 KHz to about 20 KHz.

8. The apparatus for tracking a seam set forth in claim 1, wherein said means for comparing the permeability in the flux paths is a bridge network wherein said coils are two legs of the bridge, an amplifier having the input thereof connected to the output of said bridge, and a phase detector having the input thereof connected to the output of said amplifier.

9. The apparatus for tracking a seam set forth in claim 1, wherein said means responsive to the error signal and the phase difference is a servo system.

10. The apparatus for tracking a seam set forth in claim 1, the further comprising a detector for detecting the distance between said second common plane and the adjacent surfaces of the associated ferromagnetic members, and means responsive to said distance detecting means for maintaining the distance at a predetermined value.

11. Apparatus for tracking a seam between two ferromagnetic members and controlling a work element to move along a path overlying the seam, the apparatus comprising two first ferrite cores each curved in first planes and each having the faces at the ends thereof lying essentially in a second common plane that is essentially normal to said first planes, said first cores being mounted with first ones of the faces thereof in general alignment along a longitudinal axis in said second plane and adapted in use to overlie the seam between the associated ferromagnetic members with the second ones of the faces thereof equidistantly spaced from said longitudinal axis and from the adjacent surfaces of the associated ferromagnetic members, two second ferrite cores each curved in third planes and each having a first one of the faces at the ends thereof lying essentially in said second common plane and spaced laterally of said longitudinal axis essentially equidistantly with the second one of the faces thereof equidistantly spaced from said longitudinal axis, two first coils respectively wound around said first cores and two second coils respectively wound around said second cores with each of said first coils being connected in series aiding relationship with the one of said second coils disposed on the other side of said longitudinal axis, a signal generator connected to said coils and creating a magnetic flux through said cores and the respective faces thereof and between the respective faces of said first cores and through the seam and the associated ferromagnetic member and between the respective faces of said second cores and through the associated ferromagnetic member, means for comparing the combined permeabilities in the flux paths of each first core and the associated second core with the other first core and its associated second core and generating an error signal indicating a lateral position error of the first cores with respect to the seam between the ferromagnetic members and a phase difference with respect to a reference signal indicating the direction of the lateral position error, said second cores and said second coils compensating for any error signal generated by the tilting of said second common plane with respect to the adjacent surfaces of the associated ferromagnetic members about said longitudinal axis, and means responsive to the error signal and the phase difference for returning said first ones of the faces of the first cores and the work element to positions overlying the seam and until the position error signal and the phase difference are corrected.

12. The apparatus for tracking a seam set forth in claim 11, wherein said first planes are essentially parallel to each other and said third planes are essentially parallel to each other.

13. The apparatus for tracking a seam set forth in claim 11, wherein said second ferrite cores are part-circular in shape.

14. The apparatus for tracking a seam set forth in claim 11, wherein said third planes are disposed essentially parallel to said longitudinal axis.

15. The apparatus for tracking a seam set forth in claim 11, wherein the first one of the faces of each of said second ferrite cores is disposed adjacent to the first ones of the faces of the associated first core.

16. The apparatus for tracking a seam set forth in claim 11, wherein said second coils are essentially identical to each other.

17. The apparatus for tracking a seam set forth in claim 11, wherein said means for comparing the permeability in the flux paths is a bridge network wherein the series connected first and second coils are two legs of the bridge, an amplifier having the input thereof connected to the output of said bridge, and a phase detector having the input thereof connected to the output of said amplifier.

18. The apparatus for tracking a seam set forth in claim 11, and further comprising a detector for detecting the distance between said second common plane and the adjacent surfaces of the associated ferromagnetic members, and means responsive to said distance detecting means for maintaining the distance at a predetermined value.

19. Apparatus for tracking a seam between two non-ferromagnetic members and controlling a work element to move along a path overlying the seam, the apparatus comprising two ferrite cores each curved in first planes and each having the faces at the ends thereof lying essentially in a second common plane that is essentially normal to said first planes, said cores being mounted with first ones of the faces thereof equidistantly spaced from a longitudinal axis in said second plane that is adapted in use to overlie the seam between the associated non-ferromagnetic members with the second ones of the faces of said cores equidistantly spaced from said longitudinal axis and from the adjacent surfaces of the associated non-ferromagnetic members, two coils respectively wound around said cores and connected to each other in series relationship, a signal generator connected to said coils and creating a magnetic flux through said cores and the respective faces thereof and through the associated non-ferromagnetic member, means for comparing the resultant flux in the two cores and generating an error signal indicating a lateral position error of the cores with respect to the seam between the non-ferromagnetic members and a phase difference with respect to a reference signal indicating the direction of the lateral position error, and means responsive to the error signal and the phase difference for returning the cores to positions such that the longitudinal axis therebetween and the work element overlie the seam and until the position error signal and the phase difference are corrected.

20. The apparatus for tracking a seam set forth in claim 19, wherein said first planes are essentially parallel to each other.

21. The apparatus for tracking a seam set forth in claim 19, wherein said ferrite cores are semi-circular in shape in the associated first planes.

22. The apparatus for tracking a seam set forth in claim 19, wherein said first planes are substantially parallel to said longitudinal axis.

23. The apparatus for tracking a seam set forth in claim 19, wherein the first ones of the faces are in substantial lateral alignment on opposite sides of said longitudinal axis.

24. The apparatus for tracking a seam set forth in claim 19, wherein said coils are essentially identical.

25. The apparatus for tracking a seam set forth in claim 19, wherein said signal generator produces a signal in the range from about 10 KHz to about 20 KHz.

26. The apparatus for tracking a seam set forth in claim 19, wherein said means for comparing the resultant flux in the cores of the bridge network wherein said coils are two legs of the bridge, an amplifier having the input thereof connected to the output of said bridge, and a phase detector having the input thereof connected to the output of said amplifier.

27. The apparatus for tracking a seam set forth in claim 19, wherein said means responsive to the error signal and the phase difference is a servo system.

28. The apparatus for tracking a seam set forth in claim 19, and further comprising a detector for detecting the distance between said second common plane and the adjacent surfaces of the associated non-ferromagnetic members, and means responsive to said distance detecting means for maintaining the distance at a predetermined value.

29. Apparatus for tracking a seam between two non-ferromagnetic members and controlling a work element to move along a path overlying the seam, the apparatus comprising two first ferrite cores each curved in first planes and each having the faces at the ends thereof lying essentially in a second common plane that is essentially normal to said first plane, said first cores being mounted with first ones of the faces thereof equidistantly spaced from a longitudinal axis in said second plane that is adapted in use to overlie the seam between the associated non-ferromagnetic members with the second ones of the faces of said cores equidistantly spaced from said longitudinal axis and from the adjacent surfaces of the associated non-ferromagnetic members, two second ferrite cores each curved in third planes and each having a first one of the faces at the ends thereof lying essentially in said second common plane and spaced laterally of said longitudinal axis essentially equidistantly with the second one of the faces thereof equidistantly spaced from said longitudinal axis, two first coils respectively wound around said first cores and two second coils respectively wound around said second cores with each of said first coils being connected in series aiding relationship with the one of said second coils disposed on the other side of said longitudinal axis, a signal generator connected to said coils and creating a magnetic flux through said cores and the respective faces thereof and between the respective faces of said first cores and through the seam and the associated non-ferromagnetic member and between the respective faces of said second cores and through the associated non-ferromagnetic member, means for comparing the resultant flux of each first core and the associated second core with the other first core and its associated second core and generating an error signal indicating a lateral position error of the first cores with respect to the seam between the non-ferromagnetic members and a phase difference with respect to a reference signal indicating the direction of the lateral position error, said second cores and said second coils compensating for any error signal generated by the tilting of said second common plane with respect to the adjacent surfaces of the associated non-ferromagnetic members about said longitudinal axis, and means responsive to the error signal and the phase difference for returning the cores to positions such that the longitudinal axis therebetween and the work element overlie the seam and until the position error signal and the phase difference are corrected.

30. The apparatus for tracking a seam set forth in claim 29, wherein said first planes are essentially parallel to each other, and said third planes are essentially parallel to each other.

31. The apparatus for tracking a seam set forth in claim 29, wherein said second ferrite cores are part-circular in shape.

32. The apparatus for tracking a seam set forth in claim 29, wherein said third planes are disposed essentially normal to said longitudinal axis.

33. The apparatus for tracking a seam set forth in claim 29, wherein the first one of the faces of each of second ferrite cores is disposed adjacent to the first one of the faces of the associated first core.

34. The apparatus for tracking a seam set forth in claim 29, wherein said second coils are essentially identical to each other.

35. The apparatus for tracking a seam set forth in claim 29, wherein said means for comparing the resultant flux in the cores of the bridge network wherein the series connected first and second coils are two legs of the bridge, an amplifier having the input thereof connected to the output of said bridge, and a phase detector having the input thereof connected to the output of said amplifier.

36. The apparatus for tracking a seam set forth in claim 29, and further comprising a detector for detecting the distance between said second common plane and the adjacent surfaces of the associated non-ferromagnetic members, and means responsive to said distance detecting means for maintaining the distance at a predetermined value.

37. A sensor for use in apparatus for tracking a seam between two work members and controlling a work element to move along a path overlying the seam, the sensor comprising an annular housing open at the bottom and having a free edge therearound disposed in a first plane and adapted to ride upon the adjacent surfaces of the work members defining the seam, an insulating mounting board mounted in said housing and having a first surface disposed toward said first plane and spaced inwardly therefrom and having a second surface disposed away from said first plane and defining a second plane essentially parallel to said first plane, two ferrite cores mounted on said mounting board and each curved in third planes and each having the faces at the ends thereof lying essentially in said second plane with said third planes essentially normal to said second plane, said cores being mounted with first ones of the faces thereof in general alignment along a longitudinal axis in said second plane and with the second ones of the faces thereof essentially equidistantly spaced from said longitudinal axis, and two coils wound respectively around said cores and connected to each other in series relationship and having the conductors thereto extending outwardly through said housing.

38. The sensor set forth in claim 37, wherein said housing is rectangular in cross section parallel to said first plane.

39. The sensor set forth in claim 37, wherein said housing is formed of aluminum.

40. The sensor set forth in claim 37, wherein said ferrite cores are semi-circular in shape in the associated third planes.

41. The sensor set forth in claim 37, wherein said third planes are substantially normal to said longitudinal axis.

42. The sensor set forth in claim 37, wherein said coils are essentially identical.

43. The sensor set forth in claim 37, and further comprising a wear-resistant coating on the first surface of said mounting board.

44. A sensor for use in apparatus for tracking a seam between two work members and controlling a work element to move along a path overlying the seam, the sensor comprising an annular housing open at the bottom and having a free edge therearound disposed in a first plane and adapted to ride upon the adjacent surfaces of the work members defining the seam, an insulating mounting board mounted in said housing and having a first surface disposed toward said first plane and spaced inwardly therefrom and having a second surface disposed away from said first plane and defining a second plane essentially parallel to said first plane, two first ferrite cores mounted on said mounting board and each curved in third planes and each having the faces at the ends thereof lying essentially in said second plane with said third planes essentially normal to said second plane, said first cores being mounted with first ones of the faces thereof essentially equidistantly spaced from a longitudinal axis in said second plane and with the second ones of the faces thereof essentially equidistantly spaced from said longitudinal axis, two second ferrite cores each curved in fourth planes and each having a first one of the faces at the ends thereof lying essentially in said second plane and spaced laterally of said longitudinal axis essentially equidistantly with the second ones of the faces thereof essentially equidistantly spaced from said longitudinal axis, and two first coils respectively wound around the first cores and two second coils respectively wound around said second cores with each of said first coils being connected in series aiding relationship with one of said second coils with the conductors therefor extending outwardly through said housing.

45. The sensor set forth in claim 44, wherein said housing is rectangular in cross section parallel to said first plane.

46. The sensor set forth in claim 44, wherein said housing is formed of aluminum.

47. The sensor set forth in claim 44, wherein said second ferrite cores are part-circular in shape in the associated fourth planes.

48. The sensor set forth in claim 44, wherein each of said first coils is connected in series aiding relationship with the one of said second coils disposed on the other side of said longitudinal axis when said sensor is to be used with ferromagnetic work members.

49. The sensor set forth in claim 44, wherein each of said first coils is connected in series aiding relationship with the one of said second coils disposed on the same side of said longitudinal axis when said sensor is to be used with non-ferromagnetic work members.

50. The sensor set forth in claim 44, wherein said third planes are disposed essentially parallel to said longitudinal axis, and said fourth planes are disposed essentially normal to said longitudinal axis.

51. The sensor set forth in claim 44, wherein the first one of the faces of each of said second ferrite cores is disposed adjacent to the first one of the faces of the associated first core.

52. The sensor set forth in claim 44, and further comprising a wear-resistant coating on the first surface of said mounting board.

* * * * *